Dec. 29, 1964   R. W. PARKER   3,162,927
CUTTING MACHINE
Filed March 13, 1961   4 Sheets-Sheet 2

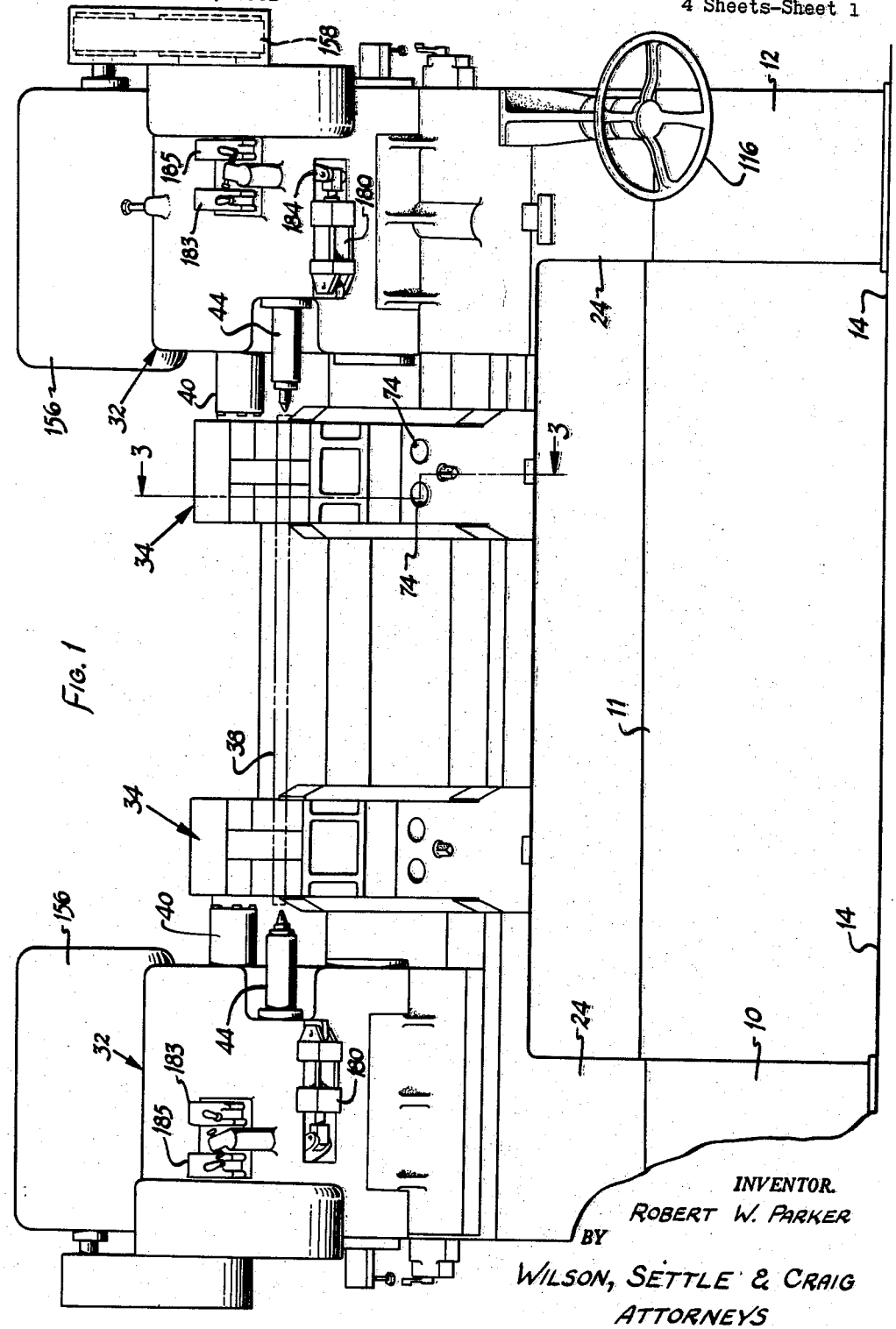

INVENTOR.
ROBERT W. PARKER
BY
WILSON, SETTLE & CRAIG
ATTORNEYS

Dec. 29, 1964   R. W. PARKER   3,162,927
CUTTING MACHINE
Filed March 13, 1961   4 Sheets-Sheet 3

INVENTOR.
ROBERT W. PARKER
BY
WILSON, SETTLE & CRAIG
ATTORNEYS

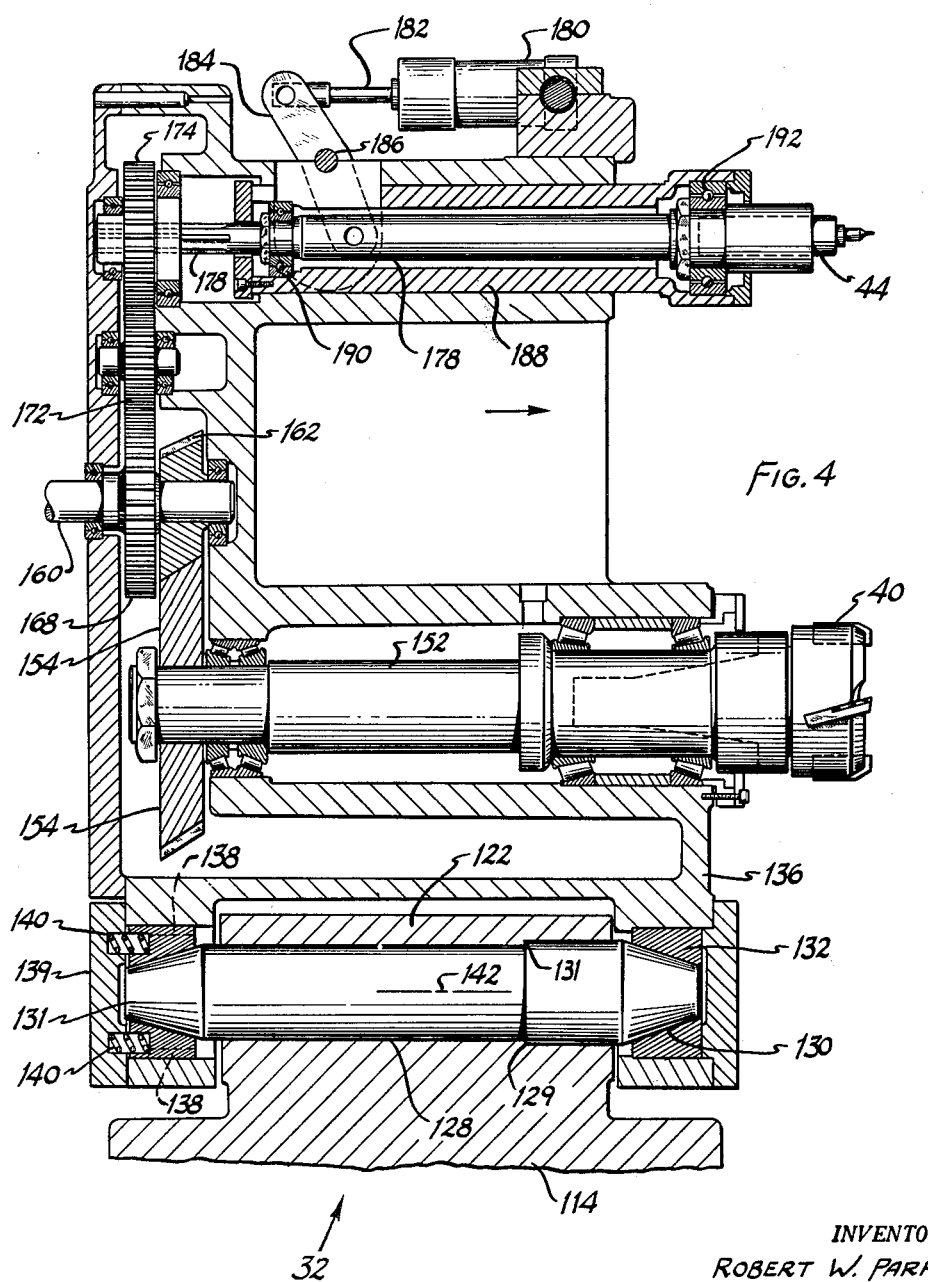

United States Patent Office 3,162,927
Patented Dec. 29, 1964

3,162,927
CUTTING MACHINE
Robert W. Parker, Howell, Mich., assignor to The Parker
Engineering & Research Co., Howell, Mich.
Filed Mar. 13, 1961, Ser. No. 95,390
12 Claims. (Cl. 29—51)

This invention relates to a machine construction, and more particularly to a machine construction for accurately facing bar stock to precise lengths, and thereafter drilling accurately positioned center holes in the end faces of the precision cut faces.

Previous to this invention devices for end facing and center drilling bar stock have been developed. However, devices of this character have been of a relatively complex nature and have required the utilization of many component machine elements and drive structures. This requirement has in the past seriously interfered with the development of a machine construction having desired features of extreme accuracy, long service life, ruggedness, and which is capable of high volume production.

With the above discussion in view, it is a primary object of the present invention to provide a machine of the above-mentioned type wherein the bar stock machining operations are very accurately performed, even after the machine has been operated for extended periods of time.

It is a further object of the invention to provide a machine of such design that it will inherently remain accurately in adjustment for long periods of time.

An additional object is to provide a machine which, although having the above "no loss of adjustment" feature, is nevertheless capable of ready adjustment to accommodate bar stock of different dimensions when occasion may require.

A further object of the invention is to provide a machine of the above-identified type having a plurality of separate but cooperating power units for putting the machine through various motions as may be required during the cutting operation, the machine having incorporated therein a particular stop construction of an extremely rigid character which is effective to absorb the heavy forces encountered during high speed heavy load applications without loss of its position of adjustment.

An additional object of the invention is to provide a machine of the above-mentioned type wherein horizontal guideways are provided to slidably support certain cutting heads and stock-clamping fixtures, said horizontal guideways cooperating with certain novel shoe structures carried by the fixtures and heads to obtain the dual advantages of easy head adjustment and rigid positionment of the head under the loads imposed during the machining operations.

In connection with the immediately preceding objective, it is a further object to provide a novel guideway-slideway arrangement whereby the supported elements, such as the cutting heads and clamping fixtures, have their weight bearing at an acute angle on the surfaces of the guideways and wherein the supported elements carry upwardly facing shoe structures which may easily be clamped against the undersurface of the guideways without necessity for overcoming the forces occasioned by the weight of the supported devices.

A further object is to provide a machine of the above-mentioned type wherein the operating components, such as the clamping fixtures, are located in forwardly tilted locations such that the bar stock can easily be moved into and out of the clamping fixtures.

A further object is to provide a machine construction and arrangement which automatically facilitates easy disposal of the chips formed during the machining operations.

A further object of the invention is to provide a machine having a motor control structure including a fluid discharge means adapted to be opened and closed during motion of an operating component. The arrangement is such that in the event chips from the cutting operation or other foreign matter are disposed on the mating head location surfaces, the fluid will continue to be discharged to atmosphere whereupon the development of back pressure to operate the pressure responsive switch controlling the operation of a motor is precluded thereby interrupting the operation of the machine except when its components are properly aligned.

Another object is to provide a machine, including a stock-clamping fixture, wherein the fixture has improved means for operating the stock-clamping fixture jaws.

A further object of the invention is to provide a novel arrangement for moving the clamping jaws whereby equalized motion will be transmitted to both jaws.

A general object of the invention is to provide a machine wherein the various components can readily be adjusted relative to one another to permit rapid loading of stock and to permit the accommodation of different sizes of stock, and to retain precision location of the components relative to one another, even with the adjustment operations and in the presence of large distortional loads caused by reactions between the cutter and work.

A further object is to provide a metal working machine designed and proportioned in such a manner that the machine is capable of withstanding the loads and stresses imposed thereon so that it is inherently precluded from distorting under heavy load operations.

An additional object is to provide a metal working machine with improved control components for facilitating high volume automatic operations.

Other objects of this invention will appear in the following description and appended claims, reference being had to the accompanying drawings forming a part of this specification wherein like reference characters designate corresponding parts in the several views.

In the drawings:

FIG. 1 is a front elevational view of a machine constructed according to the invention;

FIG. 4 is an enlarged sectional view taken substantially on line 4—4 in FIG. 2 looking in the direction of the arrows;

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figures 2, 6, 7:
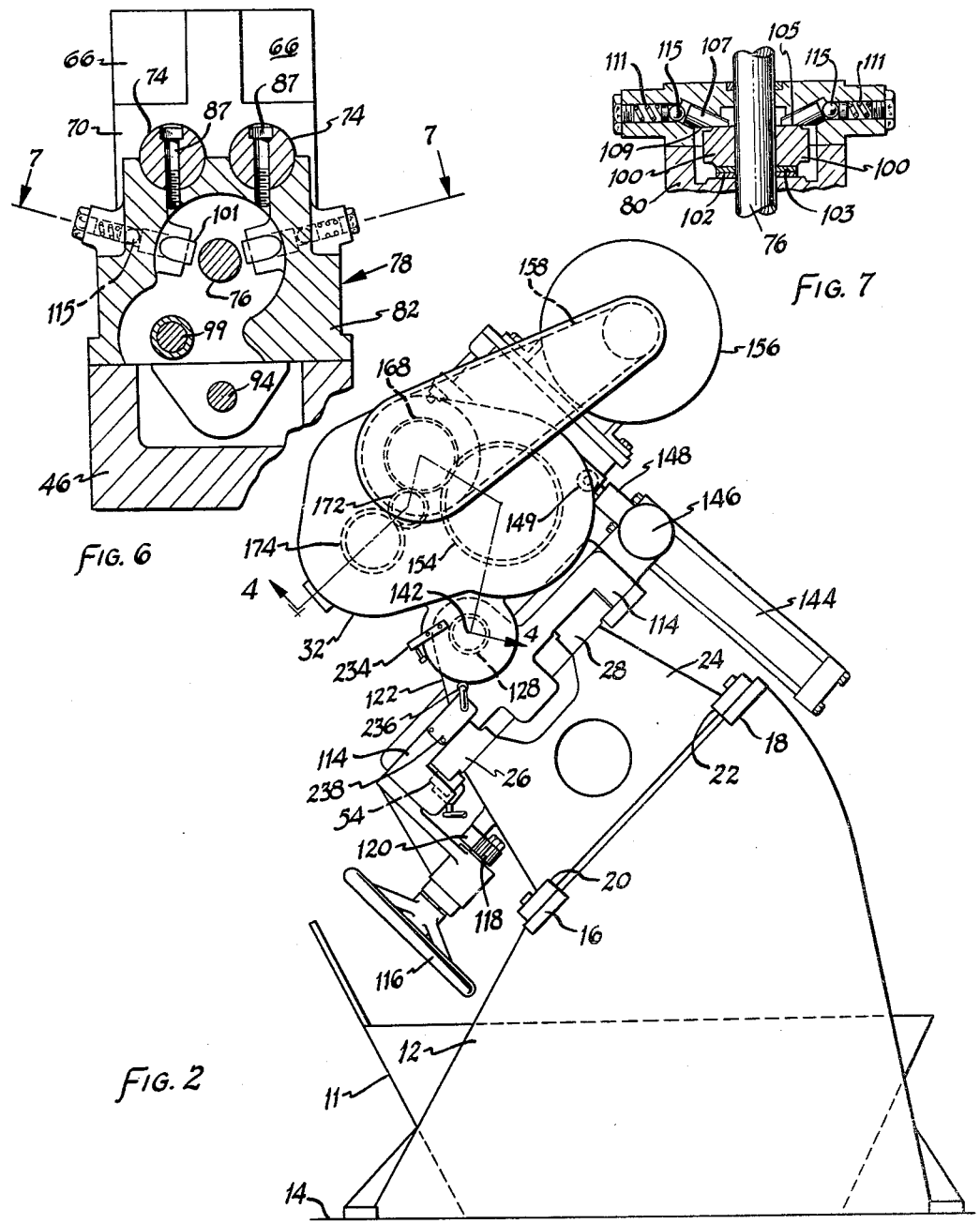
FIG. 2 is a right end elevational view of the FIG. 1 structure.
FIG. 6 is a sectional view, taken on line 6—6 in FIG. 3 and illustrating a self-compensating support for a work holder controlling shaft.
FIG. 7 is a fragmentary sectional view taken substantially on the line 7—7 of FIG. 6 looking in the direction of the arrows.

Referring to the drawings, and particularly FIGS. 1 and 2, there is shown a metal working machine including the left and right hand pedestals 10 and 12 adapted to be anchored firmly in place on the floor 14. As will be seen in FIG. 2 the upper portions of these pedestals are configured to define the elongated block structures 16 and 18, on which rest the block portions 20 and 22 of the end housing sections 24, suitable bolts being extended through the blocks to secure the end housings in fixed positions on the pedestals. Extending between sections 24 and fixedly secured thereon, are the two guideways 26 and 28. These guideways adjustably support the various machine components shown in FIG. 1, although for certain purposes of the invention at least some of the components could be non-adjustably carried by other portions of the machine.

Referring to FIG. 1, the machine components will be seen to comprise two cutter or other metal working head structures 32 of generally similar construction, and two stock-clamping fixtures 34 also of similar construction. The general arrangement of parts is such that the operator of the machine may stand in a position centrally and forwardly of the machine and insert bar stock into the clamping fixtures 34, i.e., with the stock extending horizontally across the two fixtures as indicated by the dotted lines 38 in FIG. 1. The clamping fixtures may then be closed to lock the stock in place, either manually or by power means to be described later.

Each of the cutter or other metal working heads 32 is oscillatably mounted on an axis parallel with the axis of the stock, and each of the cutter heads may be provided with a suitable metal working tool such as a rotary cutting tool 40, as well as an axially movable drill 44. Thus, with the drill held in the retracted position and the cutters 40 rotating, the two heads 32 may be oscillated forwardly so as to bring the rotating cutters 40 across the ends of the stock 38 to face the ends of the stock accurately to length. The cutter heads 32 may then be oscillated rearwardly to position the drill heads 44 in alignment with the bar stock, after which the power means for the drill heads may be energized to advance the drills into the stock for machining center holes to precise depths.

The design of the machine is such as to provide extremely precise results, both as to the length to which the stock is machined by cutters 40, the location of the holes formed by the drills 44, and the depth to which the holes are drilled. For these purposes several novel structural arrangements are incorporated in the design to ensure accurate movement of the components, even under heavy load conditions such as are encountered in a machine of this type, and even after prolonged service. These precision movements are obtained while still retaining features of adjustability such as may be necessary to adapt the machine to face and center drill differently dimensioned stock.

Figure 3:
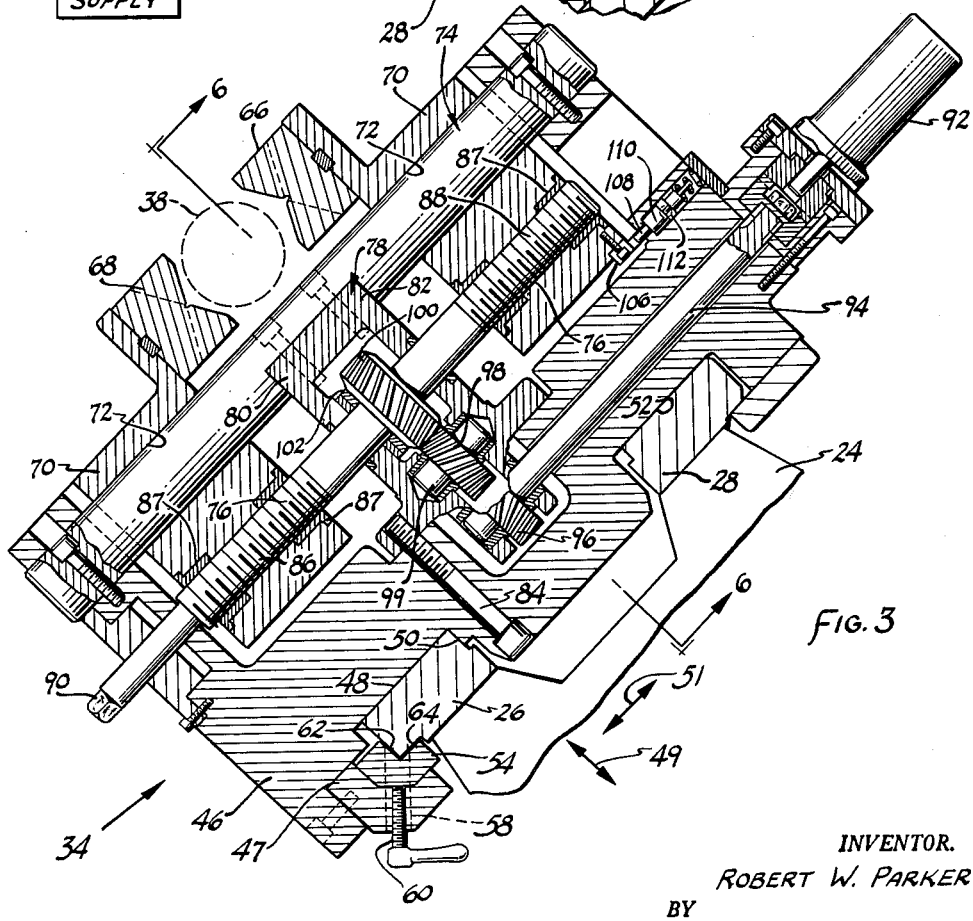
FIG. 3 is an enlarged sectional view taken substantially on line 3—3 in FIG. 1 looking in the direction of the arrows.

In the illustrated embodiment the stock clamping fixtures are of similar construction, and accordingly a description of one will suffice for a description of the other. Referring to FIG. 3, the clamping fixture is shown as being carried on the guideways 26 and 28. The main housing member 46 of the clamping fixture is of generally U-shaped configuration, and the base portion thereof is provided with the precision slide faces 48, 50 and 52 which face in generally downward directions so as to rest on the mating surfaces of the guideways 26 and 28. Thus, the entire weight of the clamping fixture is carried on the upwardly facing surfaces of the guideway.

For purposes of easily adjusting the clamping fixture along the guideways there is provided an adjustable shoe structure 54 which during the sliding motion can be retracted away from the mating surfaces of the guideway 26. However, when it is desired to lock the fixture rigidly to the guideways, the shoe structure can be advanced into a tight clamping engagement on the undersurface of guideway 26.

In the illustrated embodiment the shoe structure is slidably keyed to the block portion 47 of the fixture 46 by means of the key structure 58, and a manually rotatable screw 60 is provided to advance the shoe 54 into its collapsed position tightly engaged with the undersurface of guideway 26. It will be noted that the guideway 58 extends in a direction parallel to the bisection line between the shoe surfaces 62 and 64. By this arrangement the shoe surfaces 62 and 64 are maintained parallel with the mating surfaces of the guideway 26 so as to be capable of applying a substantial clamping pressure thereon.

In the clamped position of the fixture the weight of the fixture is carried on the surfaces at 48, 50 and 52, and there is thus no weight imposed on the shoe 54 when it is being moved to its clamped position. It will be appreciated that considerable vibrational forces or pulsations are directed onto the clamping fixture through the stock, and the use of a clamping shoe structure such as is shown at 54 is of material advantage in enabling the fixture to maintain a stable locked position on the guideways 26 and 28. Due to the shoe configuration and its direction of adjusting movement only a single adjusting action is required to lock the fixture against vibration in the two directions denoted by numerals 49 and 51.

For operational purposes the clamping fixture utilizes a pair of jaws 66 and 68 for gripping the stock 38 therebetween. Each of these jaws is suitably mounted on a slidable block structure 70, each of the blocks having a pair of guide bores 72 therein for causing the blocks to be guidably mounted on the two fixed guide rods or bars 74. Only one of these guide bars is viewable in FIG. 3, but the relative positions of the two guide bars can be seen in FIGS. 1 and 3.

In order to provide the motive force for moving the jaws 66 and 68 together, there is provided a threaded shaft 76 which is suitably supported for rotary motion in the internal housing 78. As will be seen from FIG. 3, housing 78 is formed by two mating housing elements 80 and 82, each suitably bolted as at 84 onto the main housing element 46 and to each other. The housing assembly is further rigidified by four bolts 87 (FIGS. 3 and 6) which extend through guide bars 72 into respective ones of housing elements 80 and 82.

Threaded shaft 76 is provided with the two spaced threaded sections 86 and 88 which have meshing engagement with corresponding threaded bushings 87 assembled in the two blocks 70. The threads of section 86 and 88 have the same leads and are oppositely directed with respect to one another so that rotation of the threaded shaft 76 is effective to move the blocks 70 in opposite directions. Thus rotation of the threaded shaft in one direction causes the blocks 70 to advance toward one another, and rotation of the shaft 76 in the opposite direction causes the blocks to move away from one another.

The threaded shaft 76 may be rotated either by manual means or by power means. In the illustrated embodiment the manual means may consist merely of a manually operable crank (not shown) removably or fixedly carried on the lower configurated end portion 90 of the shaft 86. The alternate power means for operating the shaft 76 may for example comprise a rotary air motor 92 having its output shaft operatively connected with the rotary shaft 94, said shaft having the gear 96 carried thereon. Gear 96 meshes with another gear 98 carried by a shaft 99. Gear 98 meshes with the gear 100 carried on the threaded shaft 76. It will be noted that gears 96, 98 and 100 are of the helical type and that during movement of the shaft 76 to close the jaws the tooth surfaces of the gear 100 tend to move the threaded shaft 76 in a downward direction against the thrust washers 102. The thrust washers are preferably alternately spaced steel and bronze members or they may be formed of any suitable bearing material. These thrust washers oppose downward thrust so that the blocks 70 are moved toward one another without any downward movement of the shaft 76. The purpose of the thrust washers 102 is to provide a firm rigid abutment structure for precluding any end play of the threaded shaft 76 such as might vary the center line of the jaws.

As more clearly shown in FIGS. 3, 6 and 7, the threaded shaft 76 is mounted in a self-compensating support. The gear 100 interposed between the threaded segments 86 and 88 of the shaft has a side face 103 engaging the thrust washers 102, and it has another side face 105 on the opposite side of the gear. Spaced cam shoes 107 having angularly related surfaces 109 engage the side face 105 of the gear 100 to yieldingly urge it toward the thrust washers 102. As more fully shown in FIG. 7 the cam shoes 107 are positioned at an appropriate angle that they control the end play of the gear 100 and shaft 76 without shifting rearwardly under the influence of the thrust forces exerted. A spring 11 mounted in housing element 82 exerts its yielding force on the cam shoes through a ball 115 which prevents cramping or binding in the transmission of the force to the cam shoes 107.

Thus there is an equalized movement of the two jaws 66 and 68 toward one another, even after extended periods of use, and the multiple surfaces of the two blocks 70 are utilized to spread the wear, and thereby maintain precision conditions after extensive use of the apparatus.

During unclamping operations the threaded shaft 76 is rotated by power means of any desired type such for example as an air motor 92 to move the blocks 70 away from one another. As the upper one of the blocks 70 moves in an upward direction the stop element 106 thereof actuates the projecting pin portion 108 of the valve element 110. Element 110 controls flow through an air port 112 which is located in the air supply conduit for the motor 92. Thus, as the upper block 70 actuates pin 108 the air valve is closed to disconnect the supply of air to motor 92, thereby de-energizing it and limiting motion of the blocks 70.

Referring now to the construction of the cutting heads 32, as previously noted both of these cutting heads are in the illustrated embodiment of substantially the same construction. Therefore a description of one will suffice for a description of the other. FIGS. 2 and 4 illustrate to best advantage the structure of the cutting heads. As shown in FIG. 2, the cutting head comprises a mounting table 114 which is in many respects similar to the mounting structure shown at 46, particularly in respect to its relationship with the guideways 26 and 28, and with respect to its employment of a mounting shoe 54 for allowing it to alternately slide or be clamped onto guideways 26 and 28.

Each cutting head is preferably of a relatively heavy construction, a hand wheel-gear arrangement is provided to facilitate movement of the movable head along the guideways, it being noted that in the embodiment illustrated one of the heads is stationary. Thus, as shown in FIGS. 1 and 2, there is provided a rotary hand wheel 116 which serves to operate a gear 118 which has meshing engagement with the rack 120 suitably carried beneath the guideway 26.

The mounting table 114 is provided with an upwardly extending lug portion or boss 122 which, as shown in FIG. 4, fixedly carries a post 128. The opposite ends of the post 128 are given frustro-conical configurations as at 130 and 131 to define thrust surfaces for bearing against the thrust bushings 132 and 134 respectively.

The post 128 has a shoulder 129 which seats against an internal shoulder 131 formed in the table mounting 114 to restrain the post 128 from shifting axially in response to thrust load exerted thereon.

Bushing 132 is fixedly carried on the housing 136 of the cutter head 32, while bushing 134 is slidably keyed to the housing by means of the key structure 138. Housing 136 is provided with an end cap element 139, and heavy compression springs are provided at 140 to maintain bushing 134 in pressure engagement against the conical surface 131. The arrangement is such as to prevent any play between the frustro-conical surfaces, even after extended periods of service. Thus the cutter 40 and the drill 44 are better enabled to have their operating surfaces always at the desired predetermined position with respect to the cutter head. There may of course be some movement of bushing 134 to the right after continued service, but the springs 140 take up any play and tend to maintain the position of the cutter head with respect to the fixed post 128. The arrangement is such that wear of bushing 134 has no effect on the precision location of cutter head housing.

As will be seen from FIG. 2 the arrangement of the table with its projection 122 is such that the cutter head is adapted to oscillate or fulcrum about the axis 142 defined by post 128. In order to power the cutter head around axis 142 there is provided a hydraulic cylinder 144 having a suitable pivotal connection at 146 with a portion of the table 114 and having a piston rod 148 suitably pivotally connected with a portion of the head 32, as at 149. Introduction of pressure fluid into the lower end of cylinder 144 is effective to fulcrum the head about the axis 142 of post 128 so as to cause the cutter 40 to traverse the end of the bar stock carried in the clamping fixture 34.

Cutter 40 is carried on a rotary milling spindle 152 which has suitably affixed thereto a helical gear 154. Power for rotating the cutter 40 is delivered from the electric motor 156 (FIG. 1) through the belt or chain drive 158 to the shaft 160 shown in FIG. 4. This shaft carries a helical gear 162 which meshes with the aforementioned gear 154 carried on spindle 152, the arrangement being such that energization of motor 156 is effective to operate the milling cutters 40.

The electric motor also provides rotary power for the drill 44. Thus the powered shaft 160 has a spur gear 168 thereof in mesh with a spur gear 172 which in turn meshes with another spur gear 174 carried on the splined spindle 178.

Alternatively the driving motor 156 may be mounted on the frame in such a manner that its driving shaft is aligned with and drives the gear 168, either directly or through an appropriate speed reducer, rather than be operably connected thereto through the driving belt.

The spindle 178 has its splines axially slidably positioned within the internal splineways of the gear 174, the arrangement being such that gear 174 delivers rotary motion to the spindle but permits the spindle to be moved axially under the axial thrust from the hydraulic cylinder 180. By this arrangement the drill 44 is given a controlled rotary and axial movement so as to effect cutting operations on the stock.

The power from cylinder 180 is delivered to the drill by a force-transmission mechanism which includes the piston rod 182 and the crank structure 184. This crank structure is fulcrummed on the cutter head housing as at 186. Portions of the crank extend inwardly beyond the pivot axis 186 so as to make pivotal connection with the quill 188, the arrangement being such that during outward movement of the piston rod 182 from cylinder 180 the quill 188 is moved in a right hand direction as viewed in FIG. 4, to its illustrated position so as to cause the drill 44 to advance into the work. During reverse movement of piston rod 182, by the introduction of pressurized fluid into the left hand end of cylinder 180 the quill 188 is retracted to the left so as to withdraw drill 44 away from the stock. Suitable bearings are provided at 190 and 192 to rotatably mount the spindle 178 in the quill 188.

As shown in FIG. 1 pivot shaft 186 for crank 184 carries a housing element 187 which, during operation of the crank serves to actuate limit switches 183 and 185 to thereby control the cylinder 180 during the drilling operations.

It will be appreciated that prior to drilling operations the cutter head 32 is operated in a cycle or sequence wherein the motor 156 and cylinder 144 (FIG. 2) are simultaneously energized to oscillate the head forwardly about the fulcrum axis 142 to mill or face off the ends of the stock 38. Before the drilling operations can begin the head must be oscillated rearwardly accurately to its starting position as shown in FIG. 2.

In order to insure accurate location of the drill with respect to the work it is necessary that precision stop means be provided for limiting the rearward oscillation of the head about axis 142. For this purpose there is provided the stop arrangement shown in FIG. 5. The stop means comprises a stop element 194 rigidly carried on the cutter housing 136, and a cooperating stop element 196 carried on the table 114. Stop element 194 takes the form of a round flat disc 198 secured to a threaded hex headed adjustable number 200 which in turn is threaded into an internally threaded bushing 202, said bushing being a rigid press fit mounting in the housing 136. In order to rigidly and securely lock the stop element 194 on the cutter head housing there is provided a locking bolt 206 having its threaded end 208 engaging in a threaded portion of the housing 136. It will be appreciated that by the arrangement of bolt 206 and the flat disc element 198 a rigid locking of the stop element is obtained.

In conventional stop element arrangements any substantial end thrust applied onto the stop element tends to apply an axial force on the threads of the stop element, with a consequent tendency of the threaded portion to work loose from the member to which it is anchored.

By the illustrated arrangement this loosening tendency is eliminated. Thus, the application of a substantial load onto stop element surface 210 does not have any effect on the locking action obtained by the threaded portion 208, since the bolt 206 is not affixed to the member 198. As a result, the threads 208 are enabled to securely lock the stop element onto the housing without danger that the stop element will lose its position of adjustment after extended service under heavy load. The anti-loosening feature is obtained while still retaining the feature of easy adjustability, since the position of the stop element can be adjusted by suitable adjusting operations with the two threaded elements.

Figure 5:
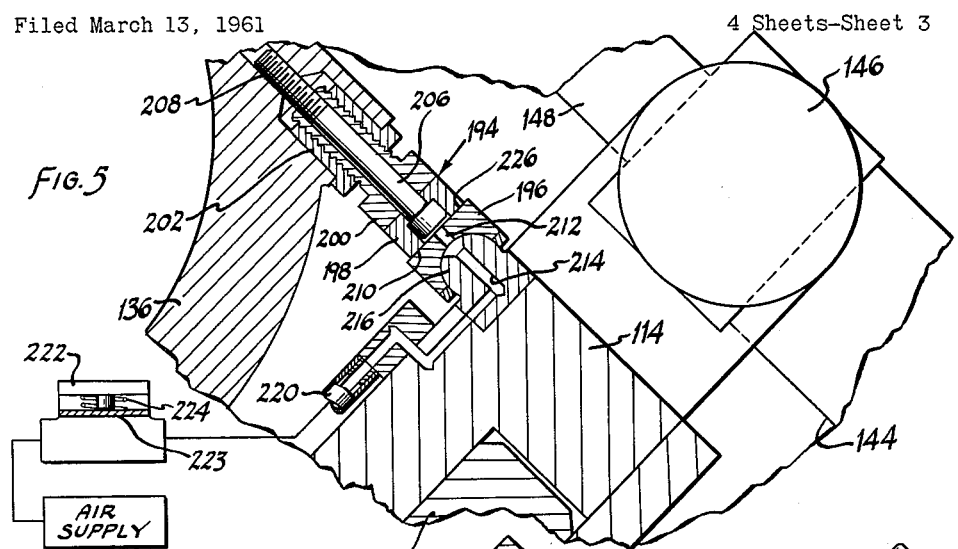
FIG. 5 is an enlarged sectional view taken through a portion of the structure shown in FIG. 2 and illustrating a fluid pressure responsive control.

It will be noted from FIG. 5 that stop element 196 is provided with a central passage 212 which registers with a passage 214 formed in the annular mounting element 216. Passage 214 is so arranged as to be fed with a supply of fluid such as air from the air line 220 which leads through a pressure-operated switch shown schematically at 222. The switch 222 controls operation of cylinder 144, and in this manner insures that head 32 will be oscillated rearwardly to a precise location before the drill 40 can be advanced into the stock.

The line 220 for controlling switch 222 is fed from a compressed air supply source, the arrangement of parts being such that during the periods when the stop elements 194 and 196 are spaced from one another air is free to flow through line 220, thence into the passages 214 and 212, and thence to the atmosphere. During such periods the pressure on the diaphragm 223 for switch 222 is unable to overcome the force of compression spring 224, and the switch is thereby inoperative or in a condition preventing operation of the hydraulic cylinder 180 for the drill (FIG. 4). Thus, a safety control is provided for preventing the drill from advancing into the work until after the head has reached the predetermined position necessary to give an accurate location of the drill with respect to the stock.

During rearward oscillation of the cutting head about the axis 142, the stop element 194 approaches the stop surface 226 formed on the stop element 196. The cooperating abutting stop surfaces 210 and 226 are formed precisely flat within desired limits so that when the surfaces meet the air discharge through passage 212 is interrupted. As a result, the air is bottled up in line 220 sufficiently to exert an increased pressure on the switch diaphragm 223 for overcoming the spring 224 and thereby operating the switch 222 to a position permitting the cylinder 180 to be energized.

In the event that chips from the stock or foreign matter should lodge on the surface 210 or 226 the surfaces will not completely close against one another and there will be a path for the discharge of air from the passage 212. The switch 222 will not be operated as above described, and the drill will thereby be prevented from operation. The operator of the machine will be apprised of this fact, and he can then clean the stop element surfaces of chips or foreign matter before continuing operation of the machine.

Any adjustment of element 194 necessary to obtain precision location of housing 136 will of course change the direction or plane of surface 210. However, this change of direction will not disturb the sealing action which is obtained between surfaces 210 and 226, since the ball-socket type mount of element 196 about element 216 is effective to change the plane of surface 226 in accordance with the plane of surface 210.

Sequentially operable controls may be employed to automatically cycle the various components through a repetitive sequence of steps necessary to mill and drill bar stock 38. In the embodiment illustrated a suitable control is actuated to automatically power the clamping fixtures 34 to positions tightly gripping the bar stock 38.

When the stock is firmly clamped the cutter heads 32 are powered forwardly by energization of cylinder 144 so as to oscillate the mills across the end faces on the stock to face the ends of the stock 38 accurately perpendicular, and to form the stock 38 accurately to length. The heads are then oscillated rearwardly by energization of the cylinders 144 to engage the stop faces 210 and 226 to place the drills in precision alignment with the bar stock. When the drills are precisely aligned with the stock the cylinders 180 are automatically energized by operation of the pressure switch 222 to advance the drills into the stock 38 an accurately predetermined distance. The cylinder 180 is then automatically re-energized to retract the drills from the stock 38. As the drills reach their fully retracted positions suitable controls such as a solenoid is automatically energized to cause the clamping fixtures 66 and 68 to release the stock 38. The operator can then remove the stock 38 and replace it with an unprocessed piece of stock. The cycle is repeated upon actuation of suitable controls such for example as a switch.

The various machine functions are controlled by various solenoid or otherwise actuated control valves and power cylinders actuated and controlled by suitable electrical and hydraulic control circuits.

The clamping jaws 66 and 68 are preferably actuated by fluid pressure operated cylinders. The jaws move toward each other for tightly gripping the stock 38 therebetween. The illustrated arrangement is such that as the jaws exert pressure on the bar stock there is a reaction force back against the shaft 94 (FIG. 3) which in turn is carried back through the motor 92 and into the air line 112. The escape of air is prevented whereupon a force is exerted on a suitable diaphragm to cause it to move to close a switch to control the motor.

After the stock 38 to be processed is securely clamped the hydraulic cylinder is energized to cause the piston rod 148 to power the head 32 forwardly. As the head is powered forwardly the mills 40 end face the bar stock 38 to the desired precision length. After the heads oscillate in the forward direction beyond the travel required to face the end of the stock 38 a suitable control is actuated to direct fluid under pressure into the upper end of hydraulic cylinder 144, and vent the lower end to oscillate the head 32 in the reverse direction. As the head 32 oscillates in the rearward direction to move the cutters beyond the ends of the processed stock 38. When the heads have been moved to the precise position when the drills are accurately aligned with the center of the stock the drills are energized as previously described, and the drills 44 are advanced by the fluid cylinders 180 to move the drills into the work a preset distance. The feed control of the drill is then reversed and the cylinders retract the drills 44. Suitable controls such as a solenoid is then actuated, for example to control a valve controlling fluid, such as air under pressure to release the clamping jaws 66 and 68.

When the stock unclamping operation is completed the operator unloads the machine and places an unprocessed piece of stock between the jaws, upon the actuation of a suitable control, either manually or automatically, the next cycle of operation is repeated to process another piece of stock.

It will be noted from FIG. 2 that the table 114 and the guideways 26 and 28 are inclined from the horizontal at about an angle of forty-five degrees. This angle permits the operator to easily load the stock into the jaws 66 and 68 of the clamping fixtures. This angle is also of advantage in that it permits improved chip disposal, it being noted in this connection that the various surfaces of the guideways and table structures, and clamping fixture structures are inclined so that the chips tend to be shed into the subjacent chip disposal trough 11. The angularity is of course also beneficial in that it causes the tables 114 and 46 to have the shoe structures 54 disposed thereon in such position as to enable the operator to quickly and easily actuate the screws 60 to clamp the structures in operative position on the guideways. In this connection it will be appreciated that if the guideways were disposed horizontally instead of inclined, a pair of adjustments would be necessary to ensure gripment of the table structures on the guideways. Thus one adjustable shoe structure would be necessary to act in a horizontal direction preventing front-to-rear shifting of the table, and a second vertically acting shoe structure would be necessary to prevent vertical vibrational movement of the table structure relative to the guideways.

It will be understood that the purpose of the adjustable mounting of the fixtures 34 and the rightmost cutter head 32 is for the purpose of adapting the machine to accommodate stock of different desired lengths. The left cutter could be adjustable if desired, but the adjustability of the two clamping fixtures and the other head is sufficient. Thus, in order to adapt the machine to relatively long stock lengths, the hand wheel 116 will be operated to dispose the right hand cutter head 32 in a rightward direction. For shorter stock lengths the hand wheel 116 will be operated to adjust the cutter head in a leftward direction. The clamping fixtures 34 will be adjusted on the guideways according to the character of the stock being handled, i.e., the points thereon which define shoulders which may serve as locators for the stock with relation to the operative cutting surfaces of cutters 40.

The drawings necessarily show specific features of construction employed in one embodiment of the invention, but it will be appreciated that variations and modifications may be resorted to without departing from the spirit of the invention as defined in the appended claims.

I claim:

1. A cutting machine comprising clamp means for bar stock; a cutterhead shiftable in a plane at right angles to the axis of the clamp means; a rotary cutter carried on the head and operable during shifting movement thereof to form a precision end face on the stock; a rotary drill carried on the head; power means for shifting said head to a position wherein the drill is aligned with the bar stock whereby a hole may be drilled in the precision end face; a mounting structure swingably supporting the head; said mounting structure comprising an axle with the longitudinal axis thereof parallel to the clamp means axis; the ends of the axle having a conical configuration; a pair of thrust bearings in the head; said bearings receiving the ends of the axle to maintain the aforementioned cutter in a precise position relative to the clamp means and bar stock carried thereby.

2. The combination of claim 1 and further characterized in that one of said thrust bearings is axially slidable; and force means applying a thrust through said slidable thrust bearing and thence through the spindle to maintain the spindle against the other thrust bearing.

3. The combination comprising a cutting machine including a pair of floor-engaging pedestal structures, a horizontal guideway structure extending therebetween, said guideway structure being tilted on its side at an angle to the horizontal, at least one table structure slidably resting on the guideway structure, clamp means carried on the guideway structure, said clamp means including a pair of clamping jaws and means for driving the jaws towards and away from each other, said driving means comprising a rotary spindle substantially parallel to the plane of the tilted guideway structure, an input gear carried centrally on the rotary spindle, and two separate output threaded sections at the ends of the spindle, each threaded end drivingly connected with one of the jaws, a thrust support bearing against one side face of the input gear, the input gear being configured to exert an end thrust on the spindle tending to maintain the gear in contact with said thrust support, movable cam structure in engagement with the other side face of the input gear, and biasing means urging said cam structure to bear against said other side face of the gear whereby to prevent play of the spindle threaded sections.

4. The combination of claim 3 and further comprising a reinforced housing for slidably carrying the clamping jaws, guide bar means rigid with the housing; said clamping jaws being slidably carried on the bar means; the stock-engaging portions of the jaws being located on one side of the bar means, and the connection with the driving means being located on the other opposite side of the bar means, whereby the driving means cooperates with the stock to prevent any play between the guide bar means and jaws.

5. The combination of claim 4 wherein the housing includes a rigid housing element of U-shaped configuration, the combination further comprising guide bar means extending between the two opposed arms defined by the U-shaped element; the guide bar means serving to reinforce the housing element, and the jaws being slidably carried on the bar means for movement therealong.

6. The combination of claim 3 wherein the cutter means comprises an oscillatable cutter head shiftable in a plane at right angles to the clamp means axis for forming a precision end face on the stock; and control means automatically operable to sequentially close the jaws, oscillate the cutter head back and forth across the jaw axis, and then open the jaws.

7. In a cutting machine, the combination comprising an oscillatable head; a cutting tool; a first power means for oscillating the head; a second power means for operating the cutting tool; and a gas pressure-operated system for insuring an accurate location of the head preparatory to operation of the cutting tool; said system including two gas-throttling elements movable relatively toward one another in response to movement of the head to a predetermined position, and gas-powered means for energizing the cutting tool power means when the gas flow is throttled.

8. The combination of claim 7 and further comprising a ball-socket mount for one of the gas-throttling elements to permit it to accurately register with the other throttling element under different operational conditions.

9. The combination comprising two oscillatably related devices, one of said devices having a shaft carried thereon, said shaft having thrust surfaces at its opposite ends; the other device having thrust bearings mating with the shaft thrust surfaces, one of said bearings being slidably keyed on said other device for movement parallel to the shaft axis; the combination further comprising pressure means maintaining an axial pressure on said one bearing to thereby prevent axial play of the shaft.

10. The combination comprising a power means; gas-pressure operated means for controlling said power means, including two gas-throttling elements movable relatively toward one another in response to movement of the power means, and pressure means for de-energizing the power means in response to throttling of the gas flow.

11. The combination comprising two relatively movable devices, and stop means for limiting motion therebetween; said stop means comprising a stop element threaded onto one of said devices; and a retainer element threaded into said one device to apply a locking pressure onto the stop element; the separate threaded engagements of the stop element and retainer element with said one device being such that end thrust to the stop element is ineffective to disturb the connection between the retainer element and one device.

12. A cutting machine comprising a pair of floor-engaging pedestal structures and a horizontal guideway structure extending therebetween; said guideway structure being tilted on its side at an angle to the horizontal; a first table structure slidably resisting on the guideway structure; an upwardly movable clamping shoe carried by the table structure adjacent the underside of the guideway structure; said clamping shoe having two diverging clamp surfaces for acting on the guideway structure to simultaneously preclude shift of the table structure in both vertical and horizontal directions; said table structure comprising a base portion and two generally upwardly extending arms cooperating therewith to define a rigid housing of U-shaped configuration; inclined guide bars extending between said arms; stock-clamping jaws slidably carried on the guide bars for movement toward and away from one another; a second table structure slidably carried on the aforementioned guideway structure; a horizontal shaft affixed to the second table structure and having thrust surfaces at its opposite ends; a cutter head having thrust bearings mating with the shaft thrust surfaces for thereby oscillatably mounting the cutter head on the second table structure; one of said bearings being slidably keyed on a portion of the head for movement parallel to the shaft axis; pressure means maintaining an axial pressure on said one bearing to thereby prevent axial play of the head on the shaft; a rotary mill carried on the head and operable during oscillating movements thereof to form a precision surface on the stock clamped in the aforementioned jaws; a rotary drill carried on the head; first power means in driving connection with the drill and mill to effect rotation thereof; second power means operatively connected with the head to oscillate it around the shaft axis whereby to cause the mill to form a precision surface on the stock and then position the head in a location wherein the drill is aligned with the formed precision surface; third power means operatively connected with the drill to advance it into the stock and then retract it therefrom; means for controlling operation of the power means including two relatively movable stop mechanisms, fluid pressure duct means discharging through one of the stop mechanisms into the space between the elements so that movement of the stop mechanisms together causes the fluid pressure flow to be throttled, and control mechanism for the second power means triggered by throttling of the fluid pressure flow; one of said stop mechanisms comprising a stop element, mount structure, and retainer element; said stop element being threaded into the mount structure, and the retainer element being also threaded into the mount structure to apply a locking pressure onto the stop element; the separate threaded engagements of the stop element and retainer element with the mount structure being such that end thrust on the stop element is ineffective to disturb the connection between the retainer element and mount structure.

References Cited in the file of this patent

UNITED STATES PATENTS

| | | |
|---|---|---|
| 572,863 | Carney | Dec. 8, 1896 |
| 1,375,896 | Carlson | Apr. 26, 1921 |
| 1,422,031 | Caulkins | July 4, 1922 |
| 1,571,331 | Hagman | Feb. 2, 1926 |
| 1,957,667 | Ritter | May 8, 1934 |
| 2,002,186 | Lovely | May 21, 1935 |
| 2,002,938 | Dumser | May 28, 1935 |
| 2,545,344 | Crawford | Mar. 13, 1951 |
| 2,682,941 | Hawley | July 6, 1954 |
| 2,686,449 | Parsons | Aug. 17, 1954 |
| 2,969,001 | Swanson | Jan. 24, 1961 |

UNITED STATES PATENT OFFICE
CERTIFICATE OF CORRECTION

Patent No. 3,162,927                      December 29, 1964

Robert W. Parker

It is hereby certified that error appears in the above numbered patent requiring correction and that the said Letters Patent should read as corrected below.

Column 11, line 18, for "resisting" read -- resting --.

Signed and sealed this 22nd day of June 1965.

(SEAL)
Attest:

ERNEST W. SWIDER                      EDWARD J. BRENNER
Attesting Officer                      Commissioner of Patents